United States Patent Office 3,517,480
Patented June 30, 1970

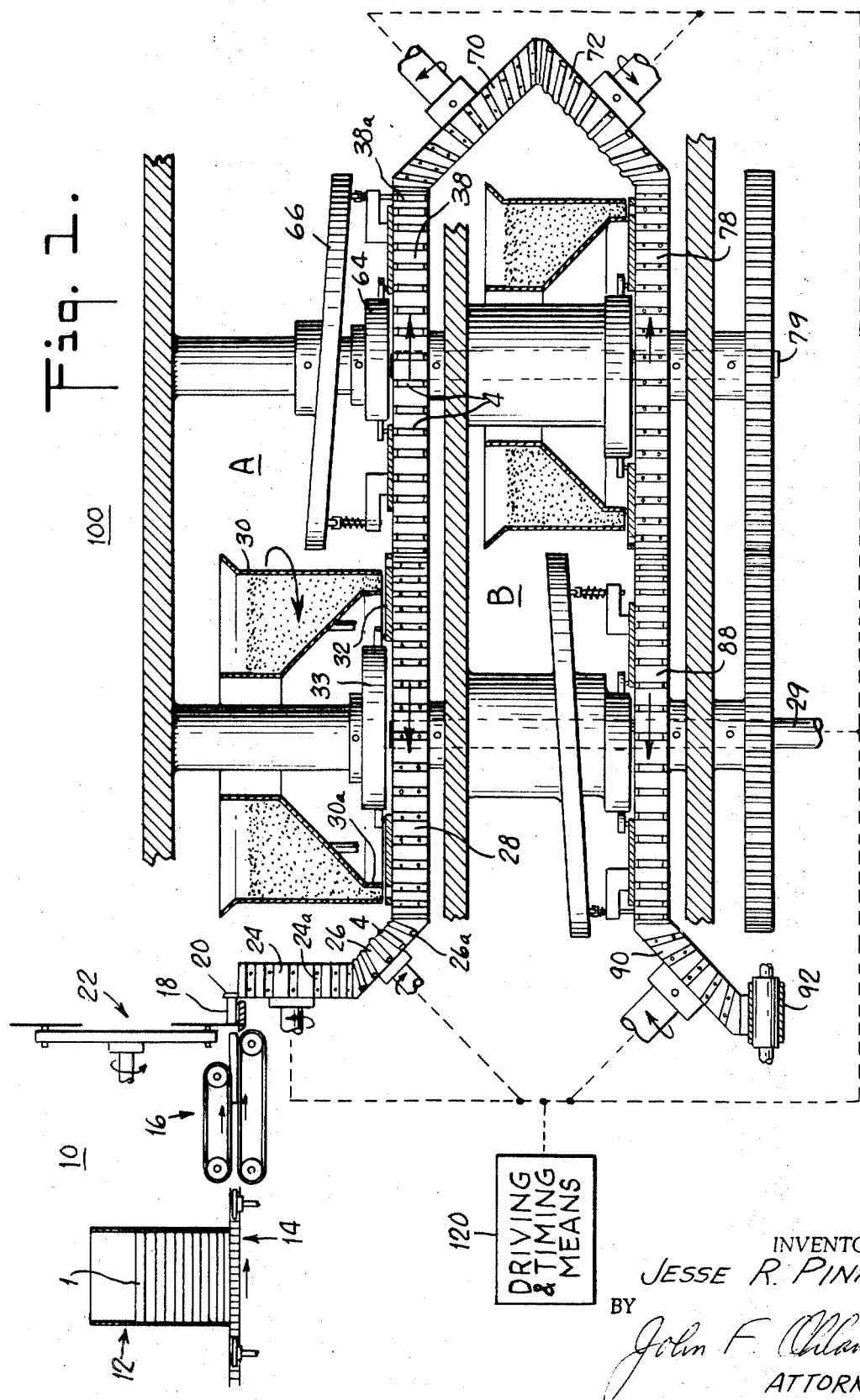

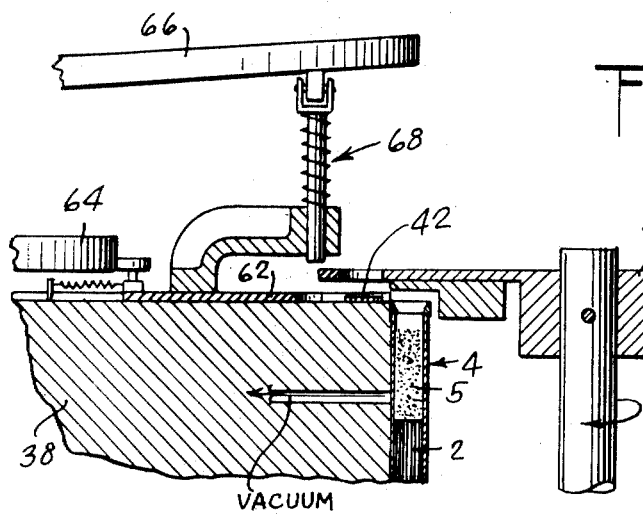
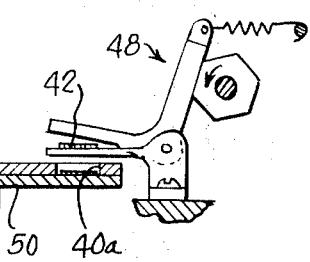
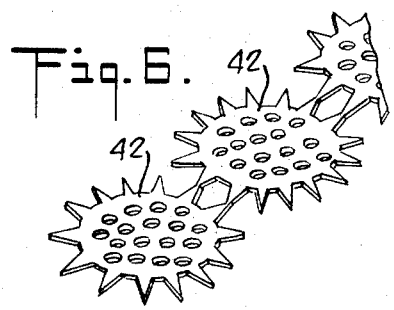
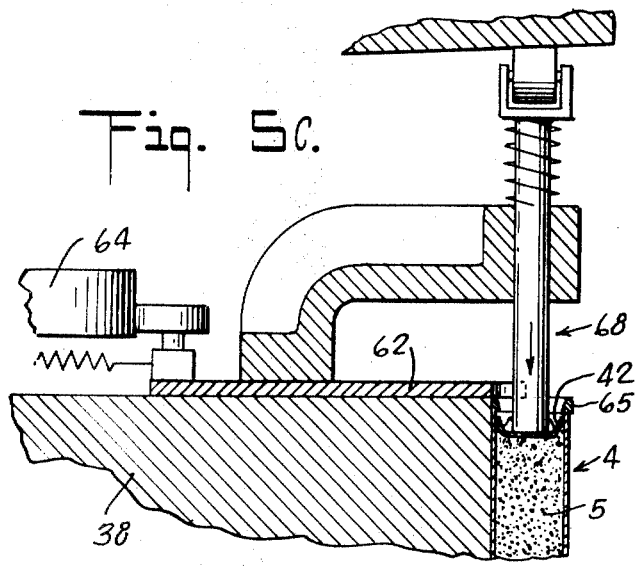
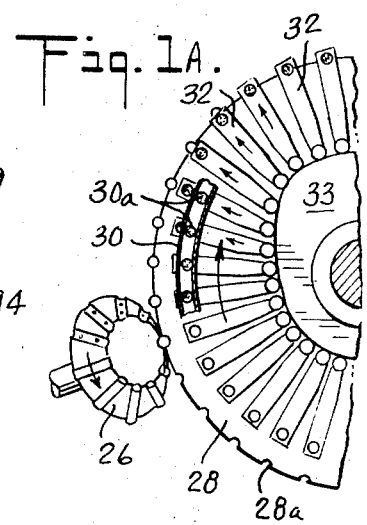
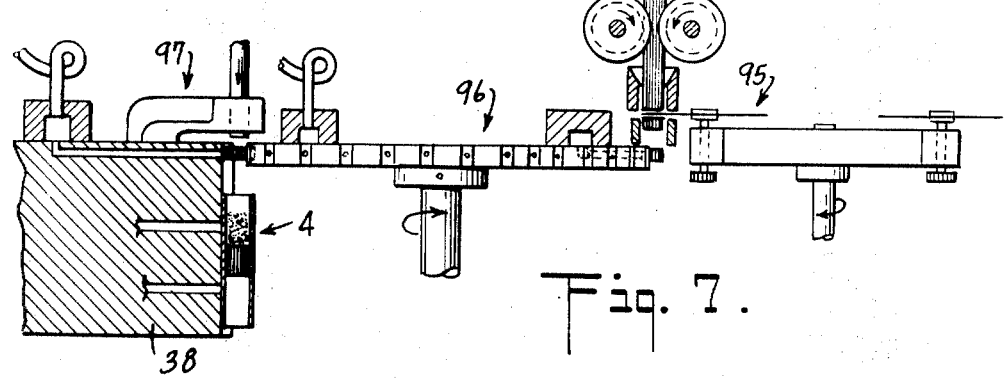

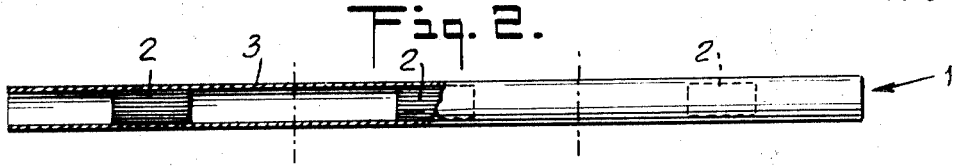
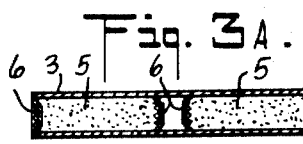
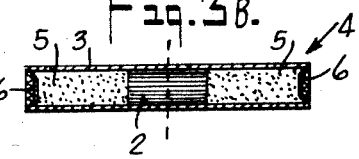
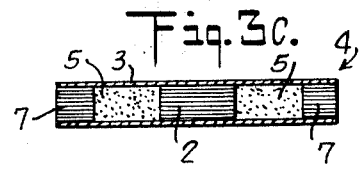
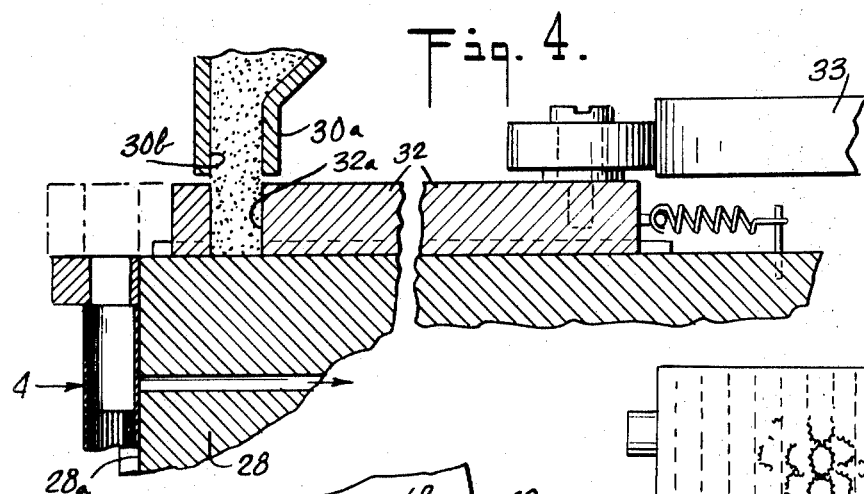
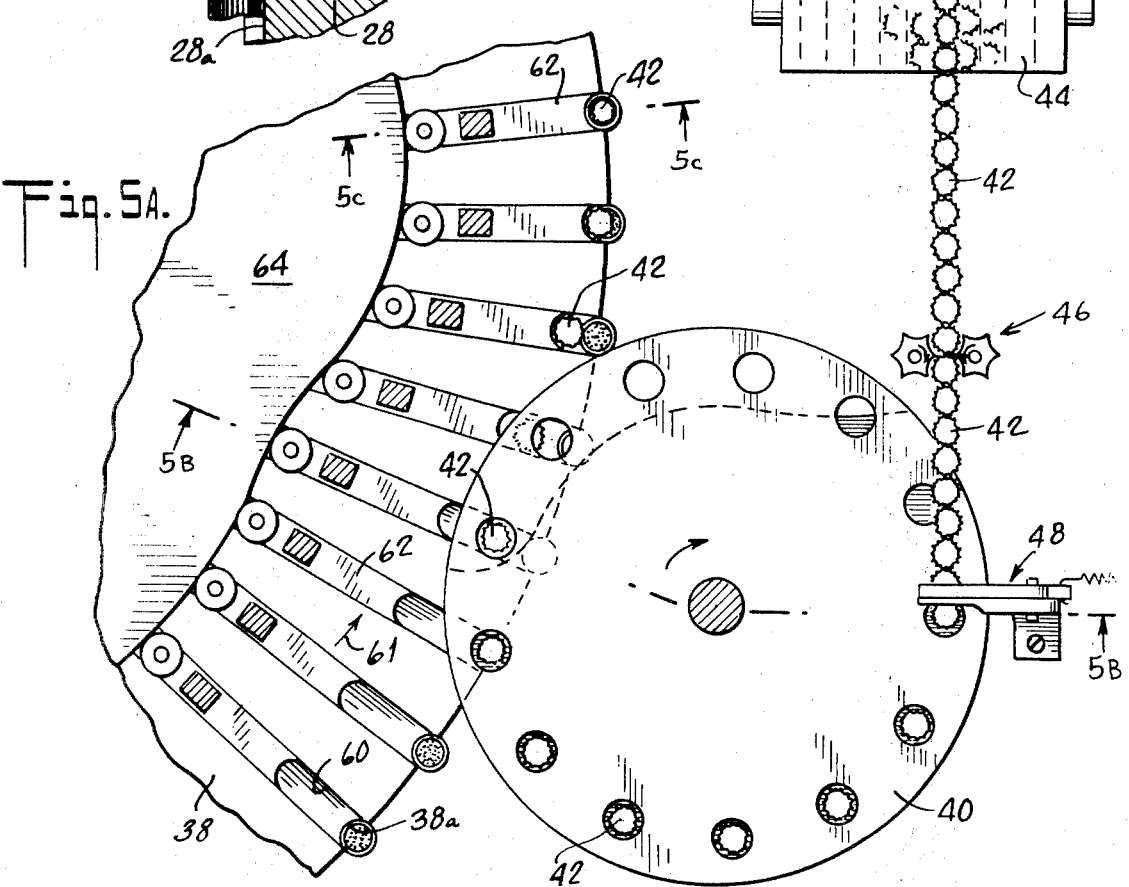

3,517,480
APPARATUS FOR MAKING LOOSE GRANULAR FILTERS
Jesse R. Pinkham, Winston-Salem, N.C., assignor to R. J. Reynolds Tobacco Company, Winston-Salem, N.C., a corporation of New Jersey
Filed Feb. 14, Ser. No. 705,472
Int. Cl. B65b 1/02
U.S. Cl. 53—183                                    15 Claims

ABSTRACT OF THE DISCLOSURE

An improvement in the production of filter tips for cigarettes and the like, the filter tips being composite types which include a plurality of sections of differing filter components, one of these components being granular material. In order to obtain good packaging of the granular component into the filter tip, means are provided for continuously feeding standard length tubes to a device which provides end-wise filling. That is to say, the discrete tubes are placed in upright position and the granular material is injected from above into their ends, thereby insuring a complete filling of the void or chamber provided in the tube.

BACKGROUND, OBJECTS AND SUMMARY OF THE INVENTION

This invention relates to an improvement in the manufacturing of filter tips for cigarettes and the like. More particularly, it relates to an improved form of apparatus, and to the method associated with such apparatus, for making filter tips whose construction is such as to include several sections of differing filter components. Thus, these sections may be constituted of what are commonly referred to as "plugs" of fibrous filter material, typically cellulose acetate and/or bonded particulant absorbent. On the other hand, some sections may be made up of granular material, for example, charcoal and the like, which material does not lend itself to bonding, spinning, webbing, or entrainment within the more conventional fibrous material and, therefore, is conveniently packed in a separate chamber defined within the tube of the filter tip.

The special concern of the present invention is that the sections of granular material be properly incorporated within the filter tip. One of the basic difficulties that arises in constructing multi-section filter tips which include such granular material is that the packing of the granular material is often not satisfactory. That is to say, there is not a complete filling of the chamber provided for the purpose.

Machines and other forms of apparatus have been known for some time that are adapted to produce the above-described composite type of filter tips, that is, those filter tips which include sections of granular material. However, many of these prior art apparatus make extremely tricky the job of getting the granular material packed into position so as to completely fill the voids normally provided. A typical apparatus for this purpose may be appreciated by referring to U.S. Pat. 3,259,029. There is described in that patent an apparatus which first acts to divide a continuous fiber rod into a plurality of plugs and then intermittently to feed these cut plugs onto a moving wrapping paper. As a result, the plugs are arranged in axially-aligned spaced relationship with respect to each other. The wrapping paper is not immediately closed so that the apparatus is able to function to inject charges of granular filter material into the series of spaces existing between adjacent fibrous plugs. Thus, this kind of apparatus completely performs the injection of granules before closing the wrapping paper to produce a rod-like assembly. This assembly is eventually cut into short lengths to provide the finished product; that is, the composite filter tips which are to be attached to tobacco columns. It will, therefore, be understood that the wrapping paper is bonded at the final stages so as to enclose both the string of fibrous plugs and the spaced granular material so that what emerges is a continuous rod consisting of an alternating succession of fibrous and granular material. What is done thereafter is that the continous rod is cut through, usually at the middle of each of the enclosed fibrous plugs, to produce the finished filter tips.

Recapitulating, and by way of providing contrast between the aparatus of the present invention and what has been known before, it should be stressed that with the typical prior art apparatus for continuous production of filter tips the procedure was to inject the granular material before closing the assembly of fibrous plugs. On the other hand, the apparatus of the present invention provides that the injection or insertion of filter components, more particularly, the insertion or injection of the granular material, is performed after the enclosing tube has been formed. Thus, the elongated tube may be divided into sections by means provided in combination with the more basic features of the invention. Alternatively, short lengths of tubing may be presented to the means for filling them with granular material.

Accordingly, it is a primary object of the present invention to overcome the difficulties attending the injection or insertion of certain kinds of granular filter material. Another more specific object, in line with the basic object above, is to fill completely the void or chamber provided for the granular material so that this material cannot be bypassed by the smoke when it seeks a path of less resistance in actual use of the filter tip.

Another object is to allow for packing or tamping the granular material to any reasonable degree that may be desired.

A subsidiary object is to fabricate filter tips for cigarettes or the like at a high production rate while insuring that the object of obtaining complete filling is also realized.

Briefly stated, then, and considering the invention in its broadest aspects, a fundamental feature of the present invention resides in the provision for the feeding of discrete lengths of tubular elements or units to a means for inserting or injecting the granular filter material. The basic objects stated above are attained in a variety of ways depending upon the particular configuration or construction of the filter tip desired. Considering for the moment the production of a filter tip which embodies three-sections, consisting of a short length of fibrous plug, a chamber filled with granular material, and at the opposite end of the chamber a cap in the shape of a disc. This cap serves to retain the granules so that they will not interfere with the smoker's pleasure. In the context, then, of producing this particular filter tip construction the apparatus of the present invention will be described in a preferred embodiment. However, it will be appreciated as the description proceeds that many varieties of filter tips can be produced in accordance with the underlying principles of the present invention.

It shoud be especially noted that a basic related principle of the present invention resides in the notion of feeding the granular material in an end-wise manner, that is, of injecting the granules from one end along the longitudinal axis of the already formed tubular element.

According to one embodiment of the invention, therefore, there is provided apparatus for producing the specific construction, noted above, for the filter tip comprising in succession a fibrous filter plug, a chamber filled with granular material, and an end-capping means. For this purpose, a more specific feature of the present invention resides in the provision of a mechanism for filling the end voids existing in a tubular element with granules of charcoal and the like, and then capping the granules. This mechanism comprises two drums arranged so that they resemble twin carrousels. The drums retain a plurality of the tubular elements in recesses or slots formed at their peripheries. As the first of these drums rotates, the tubular elements are progressively filled by metered amounts of granular material fed from a hopper. The result is that the ends of the tubular elements are completely filled with granular material. The tubular elements are then transferred to the second drum, which is constructed very similarly to the first drum. The second drum cooperates with end-capping means which function to affix such means in place within the tubular elements for retaining the granules at the ends thereof.

It has been found advantageous to supply the tubular elements in double lengths, that is, twice the length of a finished filter tip, and to fill first one end of such a double length element and then the other end. Consequently, the filling means includes a duplicate section, conveniently situated below the first section, having two drums and associated equipment identical to that already described. This duplicate section serves to repeat the two basic operations explained above but performs them at the other ends of the tubular elements.

Although the various features of the present invention embody the fundamental principles already discussed, the basic mechanisms described above are associated elements, such as timing means and the like, in order that they perform their essential functions. However, for the purposes of clarity and of simplicity in explaining basic principles, it has been thought advisable to highlight certain parts and to keep associated elements in a diminished role. Thus, the illustrations which follow in the various figures detail only the parts that are essential to an understanding of the present invention. As a result, the illustrations do not depict in detail each and every element required in the complete apparatus. Nevertheless, they suffice to convey the essential functions following the inventive principles. However, the basic parts depicted cannot be considered in utter isolation and it must be understood that they are related to elements that are presented only schematically.

The foregoing and other objects, features and advantages of the invention will be apparent from the following more particular description of preferred embodiments of the invention as illustrated in the accompanying drawing.

BRIEF DESCRIPTION OF THE DRAWINGS

FIG. 1 is an elevation view, partly schematic in form of an embodiment of apparatus for producing a filter element as illustrated in FIG. 3B.

FIG. 1A is a fragmentary plan view of the mechanism for filling the filter elements with granular material.

FIG. 2 illustrates a typical sextuple-length element that is conveniently fed to the first stage of the apparatus.

FIGS. 3A, 3B and 3C are illustrations of several configurations of filter elements formed in accordance with the concepts of the present invention.

FIG. 4 is a fragmentary elevation view showing the details of the plunger mechanism for injecting the granules into the ends of the tubular elements.

FIGS. 5A, 5B and 5C are various views of the end-capping or sealing means for retaining the granules. In particular, FIG. 5A is a fragmentary plan view of such means and FIG. 5B is an elevation view taken on the line 5B in FIG. 5A. FIG. 5C shows the details of the end-capping means in the operative position.

FIG. 6 shows a string of interconnected caps in the form of sunburst discs.

FIG. 7 is a fragmentary elevation view of a modification to the apparatus of FIG. 1 in order to provide for feeding fibrous elements at either end of the chamber of granules, thereby to produce the filter element depicted in FIG. 3C.

DESCRIPTION OF PREFERRED EMBODIMENTS

Referring now to the figures and, for the moment to FIGS. 1, 2 and 3, it will be seen that the apparatus illustrated in FIG. 1 has been designated with two basic numerals, 10 and 100, to denote its principal parts; the numeral 10 designates the mechanism or means for feeding cut filter elements to the mechanism for filling these tubular elements with a granular material, and the numeral 100 designates in general the mechanism for so filling. Furthermore, the mechanism 100 is indicated as comprising the parts 100A and 100B because these are identical parts provided for purposes to be explained.

As will be made clear, the process in accordance with the present invention begins by providing, for the sake of convenience, sextuple-length elements designated 1 in FIG. 2. These elements are six times the length of the filter tip on a finished cigarette. They are manufactured on a conventional machine and typically are provided with three-spaced plugs 2, composed of paper, estron or the like, surrounded by the paper tube 3. This feeding and cutting of sextuple-length elements is merely one convenient way of furnishing the tubular elements that are to be processed to obtain the finished product. A continuous rod feeding arrangement could just as well be provided, whereby the rod would be selectively cut into the desired lengths. In contrast therewith, single elements or dual elements could be supplied at the initial point in the process. However, it has been found convenient to handle the sextuple-length elements; it is reasonable to collect them and arrange them into transfer trays.

It will be understood that the embodiment of the apparatus in FIG. 1 is designed precisely for producing the tubular element 4, shown in FIG. 3B, as this element is derived from cutting the sextuple-length element 1 into three double-length pieces. However, by suitable modification where necessary, the other configurations, that is, the configurations shown in FIGS. 3A and 3C for the tubular elements 4, can also be produced. The common objective in the three configurations is to obtain complete packing of the end voids or chambers with granular material. The sections of granular material are designated 5.

In the particular configuration of FIG. 3B, the ends of the tubular element 4 are sealed with a disc-like cap 6. The tubular element 4 in FIG. 3A is similar in that it too is provided with end cap 6. However, this element is not derived from the sextuple-length element shown in FIG. 2; rather two additional disc-like caps 6 are provided in lieu of the plug 2; these are spaced near the middle of the element so as to leave a slight void.

The configuration for the filter element 4, as seen in FIG. 3C is, like the element of FIG. 3B, derived from the sextuple-length element 1. However, the ends are modified, i.e. the ends of this element are provided with short fibrous plugs 7 to serve as the caps or sealing means.

The tubular elements 1 are fed from the hopper 12, end to end, by means of the chain 14 and are picked up by a conveyor belt arrangement 16, whence they progress through the ledger 18 and against a stop 20 on a collector drum 24. A rotating knife group designated 22 cuts the sextuple-element 1 into three equal lengths, that is, into lengths equal to the elements 4 illustrated in FIGS. 3A, 3B, and 3C. At this point, of course, double length tubular elements 4 have voids at both ends. The elements 4 are received by the collector drum 24. This drum is a fluted drum, that is, it has a series of axially extending recesses or slots 24a at its periphery into which the elements 4 are adapted to fit. The drum 24 marks the beginning of the mechanism 100 for filling the tubular filter elements. It will be appreciated here and as the description proceeds that the various movable devices or pieces of equipment are suitably driven and synchronized by conventional drive and timing means, as indicated schematically by the dotted lines connected to the box 120.

The retention of the tubular filter elements 4 within the recesses 24a of the drum 24 is accomplished by use of a vacuum system, shown schematically. Alternatively, guide rails could be employed for this purpose. It should be noted that the vacuum system serves for the retention of the elements 4 as they progress throughout the mechanism 100. Therefore, no further reference to this system will be made.

In order to place the tubular elements 4 in an upright position for the filling of the ends thereof with granules, they are transferred from the drum 24 to a drum 26. The drum 26 is also fluted, i.e. has slots, but the slots 26a are in a bevelled surface for appropriate transfer of the filter elements to the next drum, that is, to the drum 28. This drum 28 rotates on a vertical axis, being journaled to a shaft 29 so disposed for the purpose. The drum 28 is termed the granule filler drum because it is at this stage that the granular material is fed into the tubular filter elements 4. This is accomplished as follows. The granules are fed from the hopper 30 by means of a series of metering plungers 32 extending radially above said drum 28 and carried by the drum in suitably disposed guides. The hopper 30 is rotated synchronously with the drum 28 by suitable means not shown. A plunger is provided for each of the slots 28a in the drum 28. The plungers 32 are actuated, i.e. are moved in and out responsive to a stationary cam 33 which is positioned around the axis of the shaft 29.

Reference should be made here particularly to FIG. 4 where the details of one of the plungers 32 are enlarged for clarity. The plunger 32 is designed to move under the lowermost projection of the chute 30a which is an integral part of the hopper 30. The chute 30a is provided with a series of spaced orifices 30b, which are respectively aligned with corresponding apertures 32a in the plungers 32. The plunger 32, as seen in FIG. 4, is generally rectangular in cross-section. The aperture 32a extends through the plunger for accommodating a prescribed quantity of granular material for the filling of a tubular filter element. The plunger, under spring bias, is shown in retracted position in FIG. 4, whereby the aperture 32a is positioned under the corresponding orifice 30b in the hopper chute 30a. Consequently, the aperture fills up with the metered or prescribed quantity of granules. The granules are prevented in this situation from flowing out of the aperture 32a. However, when the plunger 32 is pushed out by the cam 33, the granular material falls by force of gravity into the end void of the tubular element 4. This occurs in response to the plunger's engaging the high side of the cam 33 in its travel, i.e., as it approaches the meeting point of the drum 28 with drum 38. Although the filling of the tubular element 4 is thus accounted for solely by gravity, a vertical packing device could be provided at this stage to tamp down the charge of granular material.

When the void at the end of a typical tubular element 4 has been filled, the element is ready to be transferred to the next stage for the end-capping operation. Thus, transfer is made of the element from the drum 28 to the cap-inserting drum 38 which in construction is virtually identical to drum 28, being provided with slots 38a at its periphery. The transfer is effected by means of release of the vacuum at the meeting point of the two drums. In other words, at this point, a given tubular element 4 is shifted from its upright position in a slot 28a and is moved over to a corresponding slot 38a. The vacuum applied to the slot 38a is effective for this purpose because the vacuum normally being applied to slot 28a is released at this juncture.

As a tubular element 4 is carried along by rotation of the drum 38, a cap is inserted at the upper end thereof. In effect, then, the granules are retained in the chamber defined at that end. For this purpose, the end capping device illustrated in various details in FIGS. 5A, 5B and 5C comprises a rotating transfer plate 40 at whose periphery the caps are inserted and are carried over the tubular elements 4 as they come together with these elements disposed in the slots 38a. The caps are shown in the form of perforated discs 42 which could be composed of paper or plastic. The discs somewhat resemble a "sunburst," the solid diameter corresponding to the inner diameter of the tubular element 4 into which a disc 42 is to be inserted. The star points extend further outwardly and these fall back when a disc 42 is pressed into a tubular element 4. The discs 42 are coated with a thermosetting adhesive and at some point in the end-capping process the tubular elements would be warmed and then cooled so that the discs would become bonded to the inner wall of the tube.

A suitable arrangement for supplying the discs 42 to the plate 40 for eventual transfer and insertion is best seen in FIG. 5A. Thus, the discs 42 are connected by way of their star points to each other so that they can be conveniently handled in bobbin form, i.e. can be unwound from a bobbin 44. It will be apparent that the discs can be supplied in a number of alternative ways, e.g., in magzines or the like. A timed feeding arrangement 46 is shown in the form of two metering sprockets whose teeth engage the oncoming discs and feed them to a knife 48 which is also driven in timed relationship with the rotation of the plate 40 so as to allow the severed individual discs to fall into holes 40a provided on rotating plate 40. Plate 40 is superimposed over stationary plate 50 so that the discs 42 remain in their receiving holes 42a until they are at their desired position over the drum 38. When a given disc 42 has been carried to a point where it overlies the drum 38 is drops into one of a plurality of radial slots 60 in the top surface of the drum. The typical slot 60 extends inwardly from a corresponding slot 38a on the periphery of the drum 38 in which the tubular element is situated. The dropping of the disc results from the fact that the lower fixed plate 50 terminates and leaves an open space so that the disc can fall into the slot 60. As the drum 38 rotates, as shown by arrow 61, a horizontal radially extending plunger 62, responsive to engaging the high side of the lower cam 64, pushes the given disc 42 outwardly and positions it on a conical swaging ring 65 which is located precisely over a given tubular element 4.

By the action of another cam 66 which, like cam 64, functions in timed relationship with the rotation of the drum 38, a vertical punch 68 is brought down on the disc 42 as it is located over the swaging ring 65. The punch continues to move downwardly to a sufficient extent thereby driving the disc 42 into the tubular element 4 so that this end-capping means comes into engaement with the dposited granules 5. Thus, there is no unfilled void in the end of the element 4.

After the end-capping operation has been performed, the tubular elements 4 are transferred from the drum 38 to the next succeeding drum 70. This drum 70, and likewise the drum 72, have bevelled surfaces and together they function to invert the tubular elements 4 so that they will be in proper position for a granule filling and end-capping operation which is identical to the operation already described. Thus, part B of the mechanism 100 substantially repeats the arrangement of section 100A. The tubular elements are inverted so that the end that was previously lowermost becomes uppermost, and the granules are deposited into this uppermost void.

Accordingly, it will be understood that the drums 78 and 88 correspond respectively to the drums 28 and 38. The drum 78, as can be seen, is driven in common with the drum 38, that is, it is driven on the same shaft 79 therewith by suitable gearing to shaft 29. At the output end of drum 88, after the filling and capping steps have been performed, the completed tubular elements 4 are taken over by means of the bevelled drum 90, thence to a belt 92, for transport to a suitable station at which they are collected in trays. Then they are fed to a conventional filter tipping machine, this machine functions to affix the tobacco column or section to each end of the tubular element 4. This assembly is then severed in half forming two finished filter tipped cigarettes.

The embodiment of the apparatus as already described is directed to the production of the specific filter tip configuration as shown in FIG. 3B. It has already been made clear that the underlying principles of the present invention are as readily adaptable to the purpose of fabricating other filter tip configurations. For example, for cost or other reasons, it might be considered expedient to employ as a closure plug a short section of porous fibers bonded together. In other words, rather than the end-capping disc 42 that was described in connection with the first embodiment, it might be found desirable to substitute a cap or closure means made of short fibrous plugs. In this event, a modification in the form depicted in FIG. 7 is provided. Thus, a bonded filter rod 94 would be fed in timed relationship with the basic apparatus. The rod 94 would be cut into appropriate lengths by the knife group 95, which lengths would be fed by way of the drum 96 to the end-capping means 97, and would thereby be inserted into the ends of the tubular elements 4.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention, therefore, to be limited only as indicated by the scope of the following claims.

What is claimed is:

1. Apparatus for producing filter tips for cigarettes and the like, the filter tips being defined by a succession of filter components, one of said components being granular material, said apparatus comprising:
   means for feeding a plurality of discrete tubular elements of predetermined length, each of said tubular elements containing means therein for defining first and second chambers for receiving granular material;
   means for filling the first chamber of each of said tubular elements with granular material from one end of said tubular elements;
   means for inverting each of said tubular elements, including means for filling the second chamber from the other end of said tubular elements;
   means for sealing said chambers to retain the granular material.

2. Apparatus as defined in claim 1, in which each of said tubular elements includes a fibrous plug surrounded by heavy paper and having voids at either end of said tubular element.

3. Apparatus as defined in claim 1, in which said means for filling includes a first, granule filler, drum; said means for sealing said chamber including means for capping the ends of said chambers to insure the retention of said granules in a thoroughly packed state, said means for capping including another drum.

4. Apparatus as defined in claim 1, wherein said means for feeding includes means providing a standard length of heavy paper tubing and having chamber-defining material therein, and means for cutting said tubing to form the discrete tubular elements having voids at either end thereof.

5. Apparatus as defined in claim 1, wherein said means for filling includes means for holding the tubular elements in an upright position.

6. Apparatus as defined in claim 1, wherein said means for holding includes recesses in the periphery of a first drum.

7. Apparatus as defined in claim 6, further including a hopper means and a series of plungers extending radially above said first drum corresponding respectively to the recesses in the periphery of said drum and operative to fill the ends of the tubular elements with granular material.

8. Apparatus as defined in claim 7, including means for transferring the tubular elements from the granular filler drum to the other drum.

9. Apparatus as defined in claim 7, further including a stationary cam for actuating the plungers.

10. Apparatus as defined in claim 1, wherein said means for sealing said chamber includes means for inserting a cap over the granular material in said chamber.

11. Apparatus as defined in claim 10, wherein said cap is in the form of a disc.

12. Apparatus as defined in claim 10, wherein said end-capping means includes a second drum for retaining said tubular elements in an upright position, and further includes means for feeding the caps over said elements.

13. Apparatus as defined in claim 12, wherein said means for feeding includes a rotating transfer plate for receiving the caps in openings disposed at the periphery of the plate; a series of radially extending plungers disposed within slots at the top of said second drum and operative to move said caps over the corresponding axially extending slots in said drum.

14. Apparatus as defined in claim 13, further including a vertical punch for inserting the caps into said tubular elements and for bringing down the caps on the granular material so as to insure the packing of said material in the chambers at the ends of said tubular elements.

15. Apparatus as defined in claim 14, including a first cam for actuating said radially extending plungers and a second cam for actuating said vertical punch.

References Cited

UNITED STATES PATENTS

| 1,716,009 | 6/1929 | Schmidt | 53—281 |
| 2,200,577 | 5/1940 | Lozon | 53—281 X |
| 2,621,841 | 12/1952 | Simpson | 53—279 |
| 2,643,496 | 6/1953 | Cloud | 53—284 X |
| 2,739,432 | 3/1956 | Hirshey | 53—284 X |
| 2,993,317 | 7/1961 | Gramp | 53—284 X |

THERON E. CONDON, Primary Examiner

R. L. SPRUILL, Assistant Examiner

U.S. Cl. X.R.

53—282, 284; 93—1; 141—147

UNITED STATES PATENT OFFICE
CERTIFICATE OF CORRECTION

Patent No. 3,517,480     Dated  June 30, 1970

Inventor(s)  Jesse R. Pinkham

It is certified that error appears in the above-identified patent and that said Letters Patent are hereby corrected as shown below:

Column 1, line 17, "packaging" should be -- packing --.

Column 8, Claim 6, " Apparatus as defined in claim 1, should be -- Apparatus as defined in claim 5 --.

SIGNED AND
SEALED
OCT 13 1970

(SEAL)
Attest:

Edward M. Fletcher, Jr.
Attesting Officer

WILLIAM E. SCHUYLER, JR.
Commissioner of Patents